Nov. 3, 1970 L. J. HANCHETT, JR., ET AL 3,538,500

SYMBOL READING SYSTEM

Filed Dec. 12, 1968 5 Sheets-Sheet 1

| CODING TABLE | | | | |
|---|---|---|---|---|
| SPACE POSITION FROM RIGHT TO LEFT | FOURTH | THIRD | SECOND | FIRST |
| REGISTER SIGNALS | R1 | R2 | R3 | R4 |
| SYMBOLS | | | | |
| ZERO | 0 | 0 | 0 | 0 |
| ONE | 0 | 0 | 0 | 1 |
| TWO | 0 | 0 | 1 | 0 |
| THREE | 0 | 0 | 1 | 1 |
| FOUR | 0 | 1 | 0 | 0 |
| FIVE | 0 | 1 | 0 | 1 |
| SIX | 0 | 1 | 1 | 0 |
| SEVEN | 1 | 0 | 1 | 0 |
| EIGHT | 1 | 0 | 0 | 0 |
| NINE | 1 | 0 | 0 | 1 |
| CUE | 1 | 1 | 0 | 0 |

INVENTORS
LELAND J. HANCHETT
RICHARD E. MILFORD
BY
James A. Perahon
AGENT

SYMBOL READING SYSTEM

Nov. 3, 1970 L. J. HANCHETT, JR., ET AL 3,538,500

SYMBOL READING SYSTEM

Filed Dec. 12, 1968 5 Sheets-Sheet 5

United States Patent Office 3,538,500

Patented Nov. 3, 1970

3,538,500

SYMBOL READING SYSTEM

Leland J. Hanchett, Jr., and Richard E. Milford, Phoenix, Ariz., assignors to General Electric Company, a corporation of New York Filed Dec. 12, 1968, Ser. No. 783,385
Int. Cl. G06r 9/18
U.S. Cl. 340—146.3 8 Claims

ABSTRACT OF THE DISCLOSURE

A system is disclosed for reading symbols, each symbol formed of a predetermined number of marks coded to form a series of narrow and wide spaces between the marks. The symbols are scanned by a transducer to provide a series of time spaced pulses, each pulse representing a scanned mark. The system also compensates for extraneous material between the marks of the symbol.

BACKGROUND OF THE INVENTION

This invention relates to a system for automatically reading coded symbol and in particular to improved apparatus for accurately reading and recognizing degraded symbols containing extraneous material.

Devices for reading printed symbols are now well known. They find increasing use in the automation of data handling, such as the automatic processing of credit purchase billing documents. For example, a symbol reading system is disclosed and claimed in an application entitled Symbol Reading System, filed by Leland J. Hanchett, Jr., et al., U.S. Patent application Ser. No. 554,148, on May 31, 1966, and assigned to the assignee of the present invention. The system therein disclosed is adapted to read a font of symbols printed on a document. The font adapted to be read by the above system is shown and calimed by Klaas Bol, et al., in U.S. patent application Ser. No. 553,830, filed on May 31, 1966, entitled Machine Readable Human Language Symbols, and assigned to the assignee of the present invention.

The font disclosed by Klaas Bol, et al., comprises five spaced apart, vertical, substantiallly parallel bars. The bars of each symbol are formed with a unique combination of narrow and wide spaces between adjacent bars by which the reading sysem can distinguish each symbol from every other symbol of the font. The bars forming the symbols are preferably stylized to give a humanly recognizable form to the symbols.

Even though the system disclosed by the Hanchett, et al., application was a great advance in reliability in the automated symbol reading art, a problem sometimes occurred in the form of the symbols on a media. The media could contain a degraded symbol wherein the space between the individual bars of the symbol contained extraneous scannible material. In the Hanchett, et al., system, the extraneous or excess material could prevent the scanning means from recognizing an individual bar and thus a signal representative of the bar might not be produced. An error signal could then result signifying a failure.

The extraneous material that causes the failure might be the result of a degraded print, or a smearing of the material forming the symbol, or any extraneous matter which can be sensed by the scanning means such as pencil marks. If the extraneous material is the result of a degraded print, the spaces between the adjacent bars are partially filled with ink. Should the printer operator attempt to ease the problem by printing lighter, he might create a new problem of too light or missing bars. The documents containing any misprint have to be canceled and removed from the automatic processing to be posted by hand. This process is time consuming and results in an inefficient operation. Thus, there is a widespread need for a symbol reading system which not only can automatically read symbols that are correctly formed, but can also automatically read symbols which contain extraneous material that would have caused a rejection by previous systems.

SUMMARY OF THE INVENTION

The present invention alleviates the problem of recognizing degraded symbols in a symbol reading system. The font of symbols adapted to be read by the symbol reading system comprise a group of selectively spaced apart marks for example, the previously discussed bars of the Bol, et al., application, Ser. No. 553,830, filed on May 31, 1966. The marks of each symbol are formed in a unique combination of narrow and wide spaces between adjacent marks by which the reading system can distinguish each symbol from every other symbol of the font. The marks can have any form such as wavy lines, circles, bars and the like. The symbols are printed on a document and are read by a transducer. The transducer scans the symbols and provides an output voltage wave form of one level when a material forming the mark is sensed and a second level when no material is sensed. The output of the transducer is applied to two pulse generating circuits which together produce a train of pulse signals. Each pulse signal is spaced in time in accordance with the spacing of the marks of the symbols scanned.

The first circuit produces a pulse signal when the circuit detects the sensing of a mark by the transducer. The second circuit produces a pulse signal when this circuit detects that the transducer is sensing the extraneous material between the adjacent mark spacing. A pulse signal is produced by the second circuit only if no pulse signal is produced by the first circuit and the transducer is simultaneously sensing the extraneous material.

The train of pulse signals, mark indicating pulse signals, actuate a timing circuit. The timing circuit along with the next mark indicating pulse signal determine a code signal that is representative of the width of the spacing between the adjacent marks of the symbol. This code signal, a space width indicating signal, is detected and stored together with the other space width indicating signals obtained from the other spaces of one symbol. After a passage of a predetermined time, a time sufficient for the normal scan of only one symbol, the space width indicating signals are decoded for recognition of the symbol by the system.

It is, therefore, an object of the invention to provide a symbol reading system which can accurately recognize symbols printed on a media.

It is another object to provide a system for the automatic reading of a stylized font of symbols formed by a plurality of spaced marks, each individual symbol being formed with a different combination of narrow and wide mark spacings whereby the symbol can be recognized.

A further object is to provide a symbol reading system which can accurately recognize symbols containing extraneous material.

Another object is to provide a scanning system for scanning symbols formed by a plurality of spaced marks, each symbol being normally formed in a unique combination of narrow and wide mark spacings for providing a signal output from the scanning system representative of each symbol even though the space between the narrow mark spacings contains extraneous scanning material.

Still another object is to recognize each symbol even though the space between the narrow mark spacings is at least partially filled with printing material.

It is yet another object to provide a system for automatically reading a stylized font of recognizable symbols formed by a plurality of spaced bars, each symbol being formed with a different combination of narrow and wide bar spacings whereby a symbol can be recognized even though the narrow spaces between the parallel bars contain extraneous material resulting in a degraded print.

These and other objects will become apparent according to a preferred embodiment as the description proceeds and the features of the novelty which characterize the invention will be pointed out in particularity in the claims forming a part of this specification.

BRIEF DESCRIPTION OF THE DRAWINGS

Further features and a more specific description of an illustrated embodiment of the invention are presented hereinafter with reference to the accompanying drawings, wherein.

DETAILED DESCRIPTION OF A PREFERRED EMBODIMENT

Figures 1, 2:
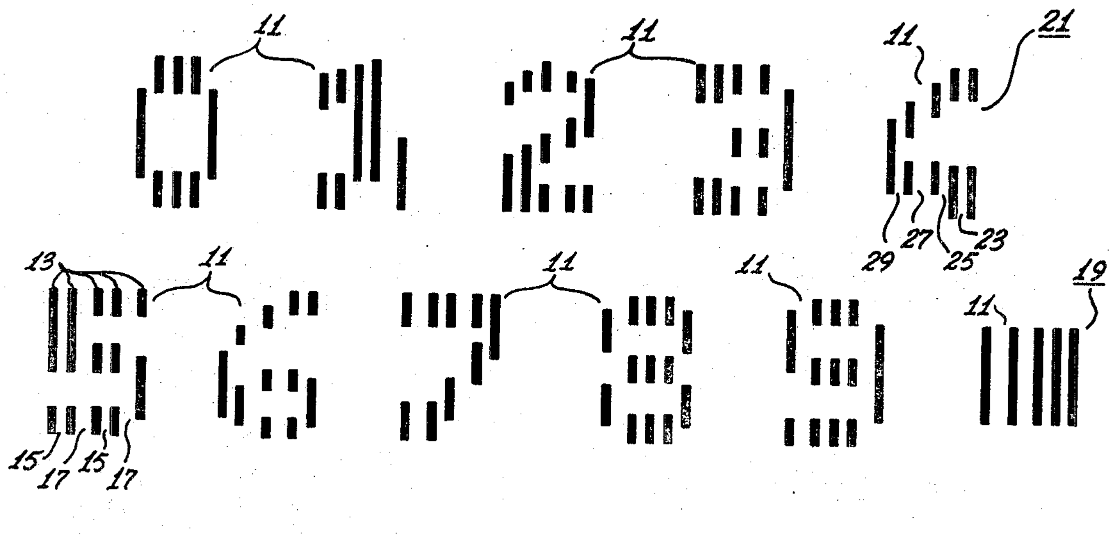
FIG. 1 illustrates a font of symbols of a type that a system of the invention is adapted to recognize.
FIG. 2 is a coding table showing the state of storage registers which store the space width indicating signals obtained from a scan of each symbol shown in FIG. 1.

In FIG. 1, a group of symbols for use by the preferred embodiment of this invention are shown according to a series of human language symbols especially designed for machine reading. Each symbol 11 is formed of five spaced-apart, substantially parallel, vertical bars 13, the bars of each different symbol being formed with a unique combination of narrow spaces 15 and wide spaces 17 between adjacent bars by which each symbol can be recognized. In addition to the numbers "0" to "9," the font of symbols includes a "Cue" symbol, shown at 19. The Cue symbol is placed on a media so that it is the first symbol scanned, and it readies the system for recognition of the symbols to follow.

As stated previously, the font of the symbols shown in FIG. 1 is shown and claimed by Klaas Bol, et al., in U.S. patent application Ser. No. 553,830 filed on May 31, 1966. The symbols may be formed, for example, with a height of 0.106 inch and with a centerline-to-centerline bar spacing of 0.012 inch for narrow spaced bars and of 0.020 inch for wide spaced bars.

In FIG. 2, a coding table is shown indicating binary logic signals for each of the symbols of FIG. 1, which signals may be ultimately decoded into a decimal equivalent of the binary signals. A scan of a symbol shown in FIG. 1 results in a pulse train of five pulses which the spaced in accordance with a spacing of the bars 13 of the symbols 11. The five pulses thus describe four coded spaces. In the coding table shown in FIG. 2, a binary "1" signifies a wide space 17 between adjacent bars, and a binary "0" signifies a narrow space 15. The binary signals of the time spacings are then placed in a register to produce a binary coded representation of the symbol scanned. Four shift register signals, R1 to R4, are shown which signify the four binary signals corresponding to the four spaces between the five bars of a symbol. The operation of a shift register which provides the shift register signals will be explained later.

The coding table of FIG. 2 shows the binary representation of each space position for each of the symbols shown in FIG. 1. As stated before, a narrow space 15 is represented as a binary "0" and a wide space 17 is represented as a binary "1." For instance, while reading the symbol "4," shown generally at 21 on FIG. 1, a scan is performed from right to left. The first space position 23 is a narrow space and is shown as a "0" in the coding table of FIG. 2. The second space 25 from the right is also a narrow space and is shown as a "0" in the table of FIG. 2. The third space 27 is a wide space and the coding table shows it as a binary "1." The fourth space 29 is a narrow space and the coding table shows a "0" in the fourth space position. Each numerical symbol is formed of a unique combination of narrow and wide spaces between adjacent bars, and each numerical symbol can be uniquely decoded into a decimal representation of the symbol.

The symbols printed on a media such as a document can be read by moving the media past a scanning slit of an optical reading transducer or scanner, in which case the symbols are printed in a manner to cause a contrast with the surface of the media. The transducer produces an output dependent upon the amount of light that is reflected from the media into a sensing element located in the transducer. In the disclosed system each bar of the symbol is printed in black on a light colored document and, therefore, the bars reflect less light to the sensing element of the transducer. Thus, the transducer will produce a voltage of one level called the black level or black potential when a bar of a symbol is scanned and a second level called the white level or white potential when no bar material is sensed.

It is apparent to one skilled in the art that several types of transducers can be used without departing from within the scope of this invention. For instance, a magnetic ink might be used to form the symbols on the media and thus, a magnetic read transducer could be used.

Figure 3:
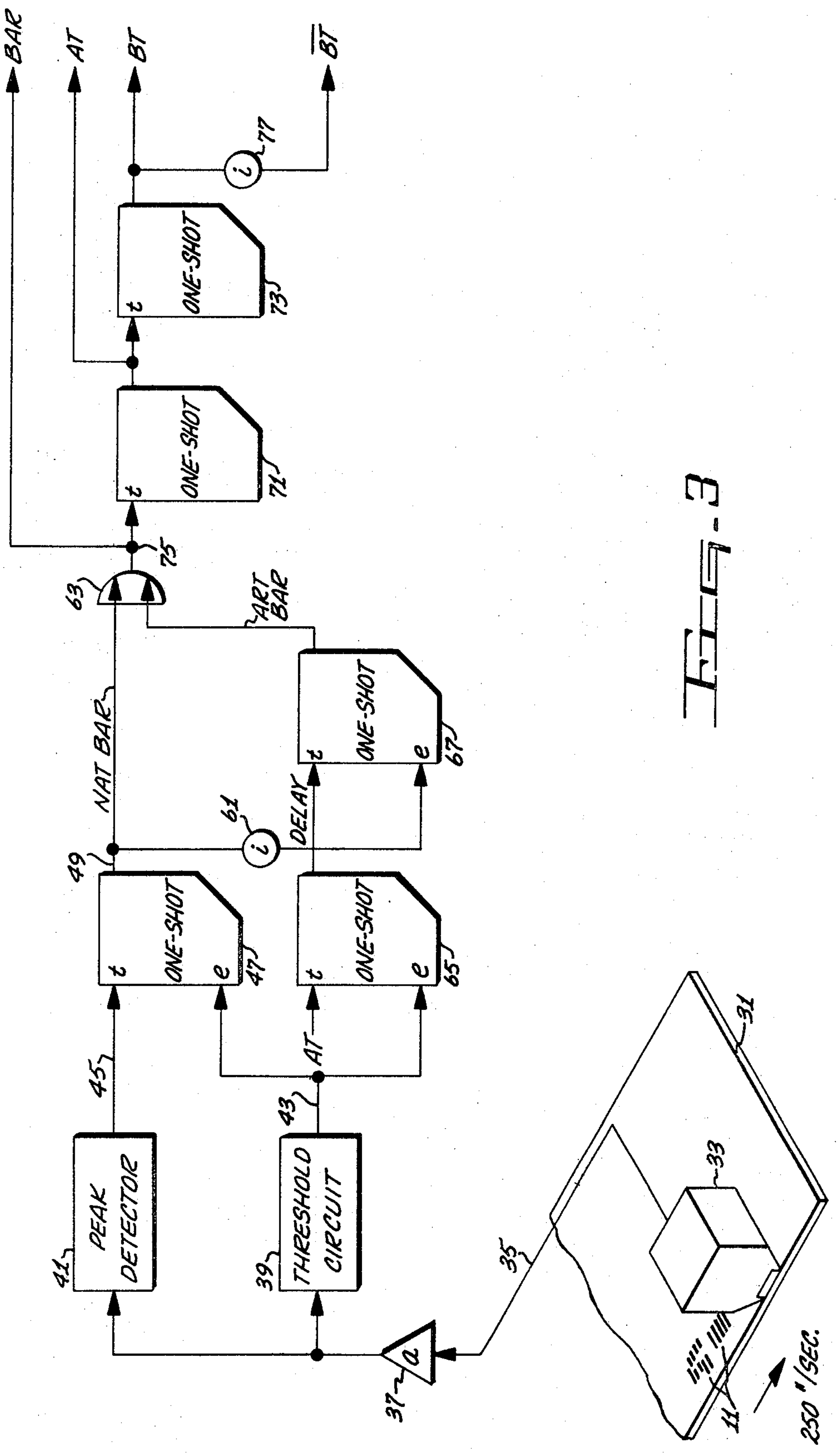
FIG. 3 illustrates in block diagram a symbol scanner and a circuit for producing a train of accurately spaced pulses corresponding to the bars forming the symbols shown in FIG. 1.

Referring now to FIG. 3, two symbols 11 are shown printed on a media shown as a document 31. To scan the symbols, the document 31 is moved to the right, as indicated in FIG. 3, by a suitable transport mechanism not shown, past an optical reading transducer shown generally at 33. The transducer 33 may be any known transducer capable of horizontally scanning the symbols. A suitable optical reading transducer for use by this system is shown by Leland J. Hanchett, Jr., in a U.S. patent application, Ser. No. 553,831, filed on May 31, 1966, entitled Optical Scanning Device, and assigned to the assignee of the present invention. The optical transducer 33 is adapted to respond to variations in light produced by a source of light located within the casing of the transducer and reflected from the document 31 and the symbols 11 printed thereon. The transducer 33 thereby produces a distinctively shaped signal for each symbol 11 scanned.

In the disclosed embodiment, each symbol 11 comprises five bars. A peak or antinode of the voltage level produced on an output 35 of the transducer represents the scanning of a bar of the symbol and a steady or lower level of the output represents the period between adjacent bars or between adjacent symbols. Since the symbol 11 contains five bars, the scanning of the symbol results in a voltage waveshape containing five peaks which are spaced in time in accordance with the bars of a symbol printed on the document. An example of the distinctive waveshape is shown generally at 51 in FIG. 6. The waveshape is of a "4" symbol. The five upward peaks 53 of this waveshape correspond to the five bars or marks of the symbol "4" and thus each peak is called a bar or mark indicating signal.

The nominal time between narrowly spaced bar indicating signals is 48 microseconds for this embodiment since the document is being transported at approximately 250 inches per second and the centerline-to-centerline spacing between the narrow spaced bars is .012 inch. The nominal time between widely spaced bar indicating signals is 78 microseconds.

Figure 6:
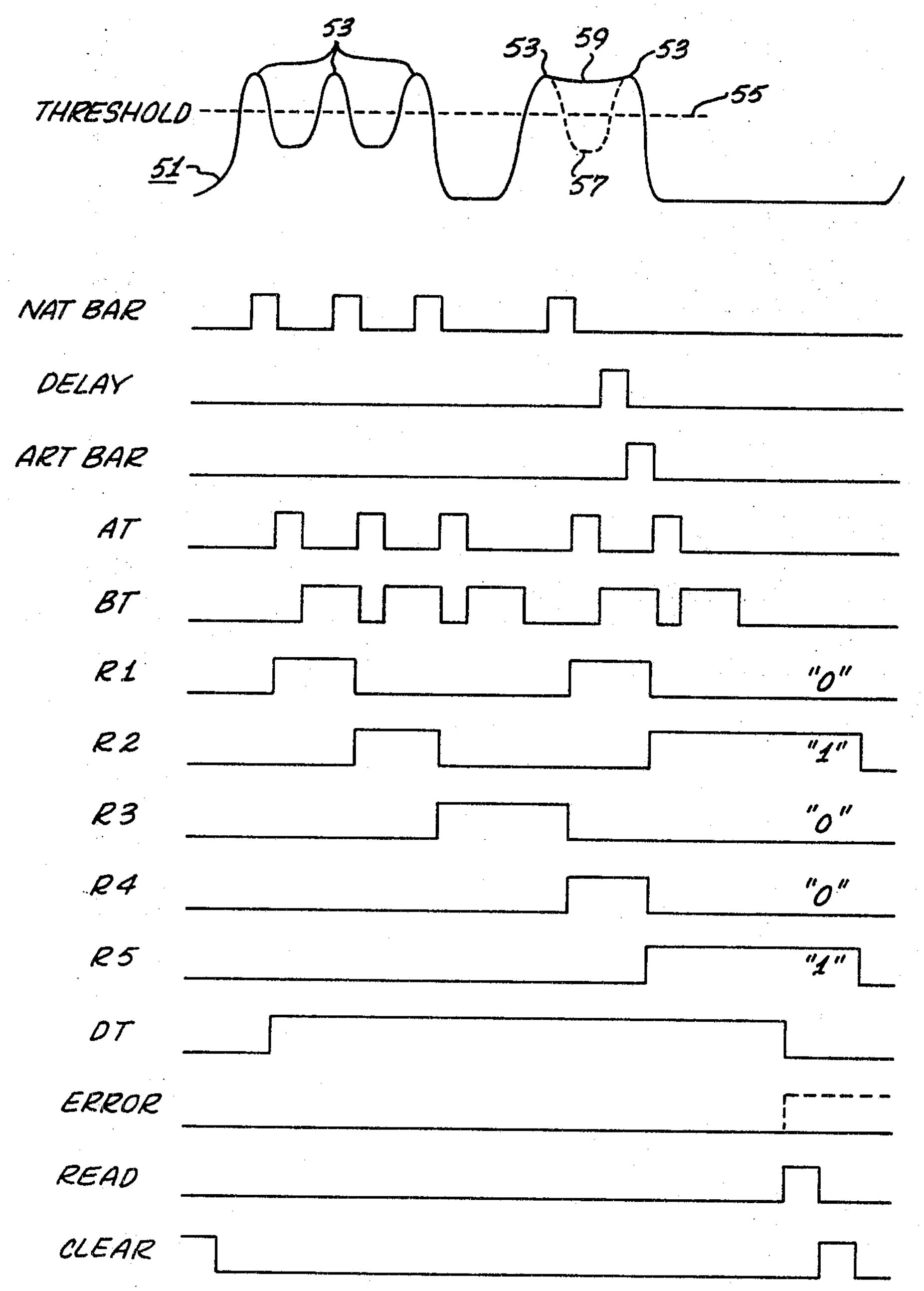
FIG. 6 is a timing diagram illustrating the relative timing of signals developed by the circuits of FIGS. 3, 4, and 5 during the scan of symbol "4."

The signal from the transducer is transported by a lead 35 to an amplifier 37. The signal is amplified and the output is applied simultaneously to a threshold circuit 39 and a peak detector circuit 41. The threshold circuit may be a well-known Schmitt trigger circuit which produces an output voltage of a given level in response to input voltages which exceed a predetermined level called the threshold level. The threshold level is adjusted as shown in FIG. 6, for example, by the dashed line 55 across the waveshape of the symbol "4." The threshold circuit 39 produces an output signal on a lead 43 at any time that the output from the amplifier 37 is above the predetermined threshold level.

The peak detector 41 is responsive to the time rate of change of voltage of the input and is adapted to produce a sharp drop in the output voltage when the input changes from a positive to a negative slope. Thus, when the signal from the amplifier reaches a peak and starts decreasing in potential, which peak corresponds to a scan of a bar by the transducer, the peak detector 41 produces a sharp drop in the voltage on lead 45. Since each symbol normally comprises five discernible bars, the peak detector, therefore, normally produces a series of five output signals spaced in time in accordance with the horizontal centerline-to-centerline spacing of the bars of the symbol. A peak detector circuit which may be adapted for use in the present system is shown by C. Djinis et al., in a U.S. Pat. No. 3,302,174 entitled Signal Position Detection Circuit, and assigned to the same assignee as the present invention.

Still referring to FIG. 3, the signals from the threshold circuit 39 and the peak detector 41 are applied to a monostable multivibrator or one-shot 47 by leads 43 and 45 respectively. The well-known one-shot is a two-state circuit which is normally in a stable reset state. A suitable input signal, in this system a negative going signal, triggers the one-shot to its astable or set state in which state it maintains for a predetermined period of time after which it automatically returns to its reset state. An example of such a one-shot circuit is shown by Abraham I. Pressman in FIGS. 11–15 of "Design of Transistorized Circuits for Digital Computers," John F. Rider, Publisher, Incorporated, New York, 1959.

The lead 45 from the peak detector 41 is connected to a triggering input terminal *t* of the one-shot 47. The lead 43 from the threshold circuit 39 is connected to an enabling input terminal *e* of the one-shot 47. The output signals from these two circuits are logically ANDed in the input circuit of the one-shot. A negative going signal on lead 45 from the peak detector triggers the one-shot to its astable or set state if, and only if, a positive or black potential output signal is simultaneously present on the lead 43 from the threshold circuit 39. This arrangement provides protection against extraneous signals from the reading transducer as might be produced, for example, by random ink splatters. Such extraneous signals may actuate the peak detector 41 but they usually are below the threshold level of the threshold circuit 39 so that the one-shot 47 is not triggered.

In its astable or set state the one-shot 47 produces an output signal of a 14 microsecond pulse width designated "NAT BAR" to indicate that it corresponds to a bar of the symbol being scanned. The NAT BAR signal appears on line 49 and is fed to an inverter 61 and a first leg of an OR-gate 63. In the normal course of events, the one-shot 47 produces a series of five NAT BAR pulses, of standardized width and amplitude, in response to the scanning of each symbol. The time spacing of the NAT BAR signals corresponds to the centerline-to-centerline spacing of the bars of the symbol.

The correct scan of a symbol depends upon the production of five pulses, each spaced apart in accordance with the spacing of the bars forming the symbol. The production of five NAT BAR pulses is dependent upon the transducer producing five bar indicating peaks and thus the transducer must detect five discernible bars. A degraded symbol in the form of extraneous material between two adjacent bars of a symbol can cause a false indication because too few peaks are sensed. The second of the two adjacent bars becomes a bar that is not discernible by the transducer and, therefore, too few NAT BAR pulses are produced. By this invention, however, the problem of extraneous material between the bars of a symbol is solved.

In accomplishing the invention by this embodiment, the output of the threshold circuit is also connected to a pulse generating circuit, shown on FIG. 3 as one-shot 65 and one-shot 67, for the production of a substitute pulse in replacement for a missing NAT BAR pulse. A substitute pulse is produced if the second of two adjacent narrowly spaced bars of the symbol is not discernible by the scanning transducer. The narrowly spaced bars were used because it was found that more printing errors resulted from narrowly spaced bars than from widely spaced bars. The symbol can be correctly recognized whether the narrow spaces are described by discernible bars or nondiscernible bars.

The pulse generating circuit comprises two one-shot multivibrators 65 and 67. An output of the first one-shot 65 is used to delay a generation of a pulse from the second one-shot 67. An output designated "AT" from a one-shot 71 is connected to triggering input *t* of the first one-shot 65. The generation of the AT signal will be explained later. The lead 43 from the threshold circuit 39 is connected to an enabling input terminal *e* of the first one-shot 65. The signals from the threshold circuit 39 and the AT signal are logically ANDed in the input circuit of the one-shot 65. Therefore if the threshold circuit 39 is putting out a high or enabling signal, when the AT signal is high which is at a time that indicates a distance between narrowly spaced bars, the one-shot 65 will be triggered to its astable state. The concurrent occurrence of the high level AT signal and the high level threshold output signal is an indication that extraneous matter is located between two adjacent bars of the symbol and that the second of the bars will probably not be sensed as an individual or discernible bar.

In anticipation that the second adjacent bar will be nondescernible by the transducer, the one-shot 65 is triggered as stated and an output signal of the one-shot, designated DELAY, is applied to a trigger input *t* of the second one-shot 67. An enabling input of the one-shot 67 is connected to an output of the inverter 61. As stated before, the input to the inverter 61 is connected to the output of one-shot 49. Thus, the second one-shot 67 will emit a pulse signal, designated "ART BAR," if, when the first one-shot 65 returns to its stable state, no NAT BAR pulse has been emitted by the one-shot 47.

An output of the one-shot 67 is connected to a second leg of OR-gate 63 for combining the ART BAR pulses with the NAT BAR pulses fed to the first leg of the OR-gate. OR-gate 63 is a standard OR logic gate. OR-gate 63 thus requires an enabling signal on any one or all of its inputs in order to have an enabled signal on its output. The output signal from the OR-gate 63 is designated "BAR" to show that these signals represent the bars of the symbol.

The BAR signals are applied to a timing circuit comprising a one-shot 71 and a one-shot 73. The purpose of this timing circuit is to provide a signal which, along with a suceeding BAR signal, will detect whether the time between the BAR signals is representative of a narrow space or a wide space. The BAR signals are applied to a trigger input *t* of one-shot 71. One-shot 71 remains in its astable state for a period required to transport the document one-half the nominal distance between narrowly spaced bars. In this embodiment, the one-shot 71 remains in its astable state for 19.5 microseconds. An output signal of the one-shot 71 is designated "AT" and this signal is applied to a trigger input of the second one-shot 73 of the timing circuit. Thus, when the one-shot 71 returns to its stable state and signal AT goes to a low level, one-shot 73 is actuated into its astable state. An output signal of the one-shot 73 is designated "BT."

The combined sum of the timing of the AT signal and the BT signal is 48 microseconds in this embodiment. This combined timing is longer than the time it takes the transport mechanism to move the document between narrowly spaced BAR signals of the symbol being scanned and shorter than the time between widely spaced BAR signals. The nominal time of this embodiment between narrowly spaced BAR signals is 34 microseconds and between widely spaced BAR signals is 64 microseconds.

The BT signal is fed to an inverter 77 to produce its inverted signal designated $\overline{\text{BT}}$. Both the $\overline{\text{BT}}$ and the BT signals are fed to a set and a reset input respectively of a flip-flop 81 shown on FIG. 4.

Figure 4:
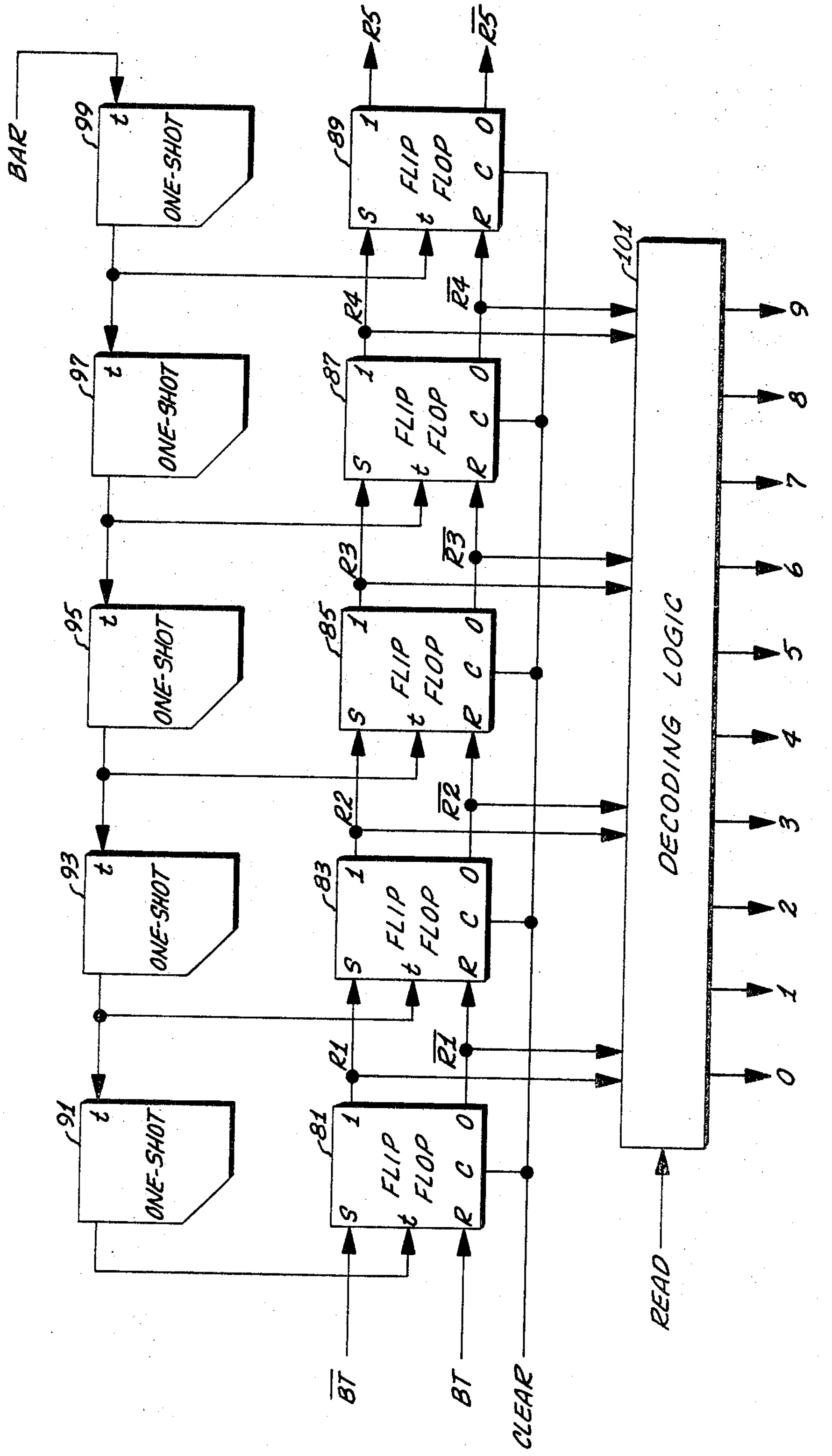
FIG. 4 shows in block diagram a shifting storage register and a symbol recognition circuit of the disclosed symbol reading system.

In FIG. 4 is shown a character recognition circuit. A series of flip-flops 81, 83, 85, 87, and 89 constitute stages of a shift storage register. Outputs of each of the flip-flops are designated R1 through R5 for a set side of each flip-flop and $\overline{\text{R1}}$ through $\overline{\text{R5}}$ for a reset side of each flip-flop. A series of very short astable time (less than one microsecond) one-shots 91, 93, 95, 97, and 99 are tied to a trigger input *t* of each respective flip-flop 81 to 89 to provide shifting pulses for the shift register. The one-shot 99 is actuated by the BAR signal applied to a trigger input *t* on one-shot 99. Each one-shot is then activated in turn by the preceding one-shot.

The *t* input of a flip-flop forms an internal AND-gate with the set or "S" input and with the reset or "R" input. The flip-flops used in this embodiment require a negative-going signal in order to be triggered. Thus, in order to effect a change of state of the flip-flop, its set input or its reset input must be in a high or enabling state when the *t* input is energized in order respectively to set or reset the flip-flop.

Thus, since every BAR signal triggers the timing circuit, one-shot 71 and one-shot 73 of FIG. 3, each succeeding BAR signal and the state of the BT and $\overline{\text{BT}}$ signals from one-shot 73 and inverter 77 respectively determines whether flip-flop 81 is to be set or reset. Flip-flop 81, therefore, determines the binary number which is representative of the width of the spacing between adjacent bars of the symbol.

The shift register of this embodiment comprises five stages of which four are used to register the binary signal determined in the first stage and shifted along by the succeeding BAR pulses. The fifth stage indicates to the system that all five BAR signals of one symbol have been received for a particular symbol scanned. The outputs, R1 to R4, of the first four stages are fed to a decoding logic circuit 101 which converts the binary signals from the shift storage register to a decimal signal. The decimal signals are designated as 0 to 9 on FIG. 4. The conversion takes place after the scan of a complete symbol by the activation of a READ signal, as will be discussed later.

Figure 5:
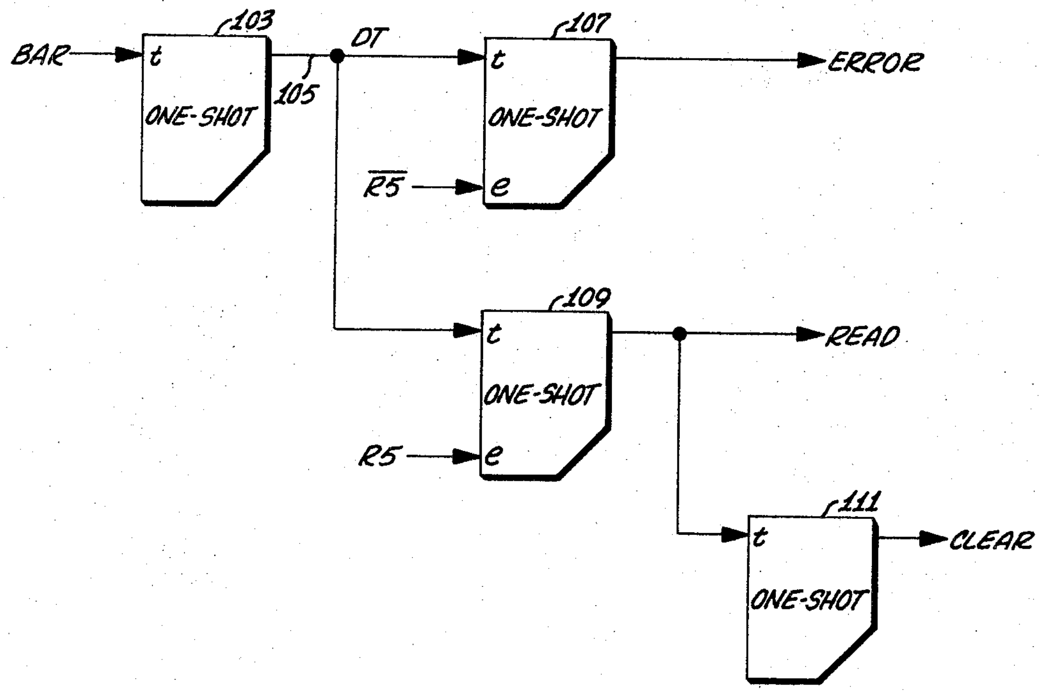
FIG. 5 illustrates in block diagram a control circuit of the disclosed symbol reading system.

A series of one-shot circuits are shown in FIG. 5. These circuits provide the pulses which signal the conclusion of the scan of one symbol. A one-shot 103 is triggered to its astable state by the BAR signal applied to a *t* input of the one-shot 103. One-shot 103 will remain in an astable state for a period of time nominally required to complete the scan of one symbol. In this embodiment, the nominal time to scan one symbol is 235 microseconds.

The one-shot 103 has an output signal, shown on the drawing as signal "DT." The DT signal is applied to a "*t*" input of a one-shot 107 and to a similar input of another one-shot 109. The one-shot 107 has the $\overline{\text{R5}}$ signal applied to its enabling input. The one-shot 107 has the R5 signal applied to an enabling input. Thus, when the one-shot 103 returns to its stable state and the DT signal goes negative, the state of the fifth stage of the shift register of FIG. 4 determines whether or not a correct scan has occurred. If a scan is correct, the one-shot 109 is activated and a READ signal is produced. If the scan is incorrect, the one-shot 107 is actuated and an ERROR signal is produced. The READ signal is applied to the decoding logic of FIG. 4 and enables the decimal outputs shown as outputs 0 to 9 from the decoding logic circuit 101. The READ signal is also applied to a *t* input of a one-shot 111 on FIG. 5. The output signal from the one-shot 111 is designated "CLEAR." The CLEAR signal is applied to an input designated "C" of each flip-flop which comprises the storage shift register, flip-flops 81, 83, 85, 87, and 89, of FIG. 4 and signals the end of a correct scan of a symbol and clears the circuits in preparation for the next symbol.

Suitable logic circuits for those described in the figures may be found in the above-mentioned book by Abraham I. Pressman. In the preceding and in the following description, a signal that is said to be at an arming or enabling level is generally referred to as at a high level, or simply that the signal is high. Whereas, a signal that is at a disarming or disabling level is referred to as a low level or that the signal is low.

Operation of the system shown in FIGS. 3, 4, and 5 will now be described with reference to the timing diagram of FIG. 6 which shows the relationship between the various signals and the state of the register stages during the scanning and recognition of a symbol "4." Referring to FIG. 6, a scanned "4" symbol produces a waveshape 51 on the output of the transducer. A solid line 59 shows the resultant waveshape of a degraded print of the symbol "4." A dashed line 57 shows the form of the waveshape of a correctly printed symbol "4." The other signals shown in the timing diagram of FIG. 6 are the outputs of the various one-shot circuits and flip-flops shown on FIGS. 3, 4, and 5. The various inter-relations of the signals will be described in the scan of a symbol. It will be assumed for the further description of the system that a Cue symbol has just been sensed. Thus, the circuits have been prepared for the scan of the next symbol which for the purpose of this description is a symbol "4."

Referring again to FIG. 3, after the scan of the Cue symbol, the document continues to travel in the direction of the arrow by the action of a transport system (not shown). The first bar of the symbol "4" is sensed by the scanning transducer resulting in the first peak of the waveshape 51 (shown in FIG. 6). The signal from the amplifier 37 activates the peak detector 41 and the threshold circuit 39. The peak detector 41 and the threshold circuit 39 triggers one-shot 47 to its astable state and a NAT BAR pulse is transmitted through OR-gate 63 to become a BAR pulse. The BAR pulse triggers one-shot 71 and is also fed to the shifting one-shots of the character recognition circuit of FIG. 4.

In FIG. 4, the BAR pulse actuates the one-shot 99 to its astable state and a triggering signal is applied to a triggering input terminal of flip-flop 89. When the one-shot 99 returns to its stabe state, the trailing edge of its output pulse triggers the next one-shot 97. This action proceeds down the series of one-shots with each one-shot in turn triggering the respectively associated flip-flop. As stated before, the end of the scan of a symbol clears the shifting storage register by the CLEAR signal fed to the C input of the flip-flop. Thus, the register flip-flops are all reset or cleared before the first pulse of a symbol and 0's are shifted through the register.

Flip-flop 81 on FIG. 4 is set to a "1" state by one-shot 91 because, as can be seen in the timing chart of FIG. 6, the BT signal is low on the first bar scanned and, therefore, its inverted signal $\overline{\text{BT}}$ is high. The $\overline{\text{BT}}$ signal is fed to the set side of the flip-flop and thus, when the one-shot 91 returns to its stable state, a "1" is placed in flip-flop 81 by the enabled internal set AND-gate of this flip-flop. The timing chart on FIG. 6 shows the output signal R1 of flip-flop 81 being set by the first NAT BAR signal.

This "1" will subsequently be shifted through the register to flip-flop 89, the fifth stage of the register, where it will later indicate that five BAR pulses have been received if they have in fact been received.

The BAR signal developed on FIG. 3 is also fed to one-shot 103 on FIG. 5. One-shot 103 puts out the DT signal. As seen in FIG. 6, the DT signal is high for a time period sufficient to complete a normal scan of one symbol. Because of the design of the one-shot circuits, all other BAR signals applied to the trigger input of one-shot 103 do not affect the timing of the astable state of one-shot 103.

Returning now to FIG. 3, the BAR signal triggers one-shot 71 to its astable state and its output signal AT goes high. The AT signal returning to its disabling level triggers one-shot 73 and its output signal BT goes high. As was stated before, the sum of the astable time periods of the AT signal and the BT signal combined is 48 microseconds. The period between closely spaced BAR signals is 34 microseconds.

The second peak of the symbol "4," waveshape 51 on FIG. 6, is a narrowly spaced peak since, as can be seen in FIG. 1, the first space 23 is a narrow space. Thus, the second peak will produce a second NAT BAR signal from one-shot 47, see FIG. 3, which is spaced from the first NAT BAR signal by approximately 34 microseconds. The second NAT BAR signal produces a BAR signal. The BAR signal in turn activates one-shot 71, which produces another AT signal, and also actuates one-shot 99 on FIG. 4 to produce a shifting pulse.

One-shot 99 triggers the entry of the "0" from flip-flop 87 into flip-flop 89 and also triggers one-shot 97. One-shot 97 in turn triggers the "0" from flip-flop 85 into flip-flop 87 and proceeds to trigger one-shot 95. Each one-shot in turn transfers the state of a preceding flip-flop into the flip-flop associated with the particular one-shot. Thus, the high level R1 signal is transferred or shifted to flip-flop 83 and the R2 signal becomes high when one-shot 93 returns to its stable state after being actuated by one-shot 95. One-shot 93 triggers one-shot 91 to its astable state. Flip-flop 81 is reset by the one-shot 91 because the second BAR pulse is received 34 microseconds after the first and thus, the BT signal which resulted from the first BAR pulse signal is still high. The internal AND-gate of flip-flop 81 returns the flip-flop 81 to its reset or "0" state. The signals applied to the input of the flip-flop do not cause a change in the state of the flip-flop until a trigger signal is received at a triggering input *t* of the flip-flop. Thus, after the second BAR signal, the R2 signal is high from the shift of the R1 signal, see FIG. 6, and the R1 signal is low, signaling that the first space is a narrow space.

The second AT signal in turn triggered one-shot 73, see FIG. 3, and a second BT signal is produced to await the receipt of the third BAR pulse. As seen in FIGS. 1 and 6, the third bar of the symbol "4" describes a narrow space 25 and the NAT BAR signal from one-shot 47 is again spaced from the preceding NAT BAR pulse by approximately 34 microseconds. The third NAT BAR pulse is fed through OR-gate 63 and becomes a BAR pulse. The BAR pulse triggers one-shot 71 and produces a third AT signal. The BAR pulse again also triggers the shifting one-shots of the character recognition circuit of FIG. 4 and the "0" of flip-flop 87 is shifted to flip-flop 89; the "0" of flip-flop 85 is shifted to flip-flop 87; the "1" of flip-flop 83 is shifted to flip-flop 85; and the "0" of flip-flop 81 is shifted to flip-flop 83. In short, the R1 signal is shifted to R2, R2 is shifted to R3, R3 is shifted to R4, and R4 is shifted to R5.

Since the third BAR signal describes a narrow second space, the BT signal is high on the input to flip-flop 81 when one-shot 91 is triggered in turn and another "0" is put into flip-flop 81 showing that another narrow space has been described by the adjacent BAR signals.

The third AT signal in turn tiriggers the one-shot 73 for the third BT signal. As seen in FIGS. 1 and 6, the next or fourth bar of the symbol "4" describes a wide space 27. Thus, the fourth BAR signal occurs 64 microseconds after the third BAR signal. The fourth BAR signal results from the receipt of the fourth NAT BAR signal through the transducer 33, the peak detector 41, and the threshold circuit 39, of FIG. 3, as previously described.

The fourth BAR signal triggers the one-shot 71, see FIG. 3, and a fourth AT signal is emitted. The fourth BAR signal effectively causes the "0" of R4 to be shifted to R5; the "1" of R3 to be shifted to R4; the "0" of R2 to be shifted to R3; and the "0" of R1 to be shifted to R2, see FIG. 4. The fourth BAR pulse occurs after the third BT signal returns to its low or stable state and the $\overline{BT}$ signal is high. One-shot 91, when it is triggered in turn and then returns to its stable state, will set flip-flop 81 to its "1" state. As stated previously, the representation of a wide space was taken as the "1" binary state and it is in flip-flop 81 that this "1" is developed. Thus, the R1 signal from flip-flop 81 is high after the fourth BAR pulse (see FIG. 6) since the third and fourth BAR pulses described a wide space.

The fourth AT pulse in turn triggers one-shot 73 on FIG. 3 and a fourth BT pulse is emitted. Also, at the time the fourth AT pulse goes low, the symbol "4" waveshape 51 on FIG. 6 is above the threshold level 55 as represented by the line 59. The normal pattern for the waveshape of a discernible bar is symbolized by the dotted line 57 whereby the fifth peak from the discernible bar would produce a fifth NAT BAR pulse. However, the peak detector circuit 41 can only recognize a negative change in slope of the waveshape. Since there is no negative change in slope at this time, the peak detector will not provide a trigger pulse to actuate the one-shot 47 into producing a NAT BAR pulse The combination of the AT pulse going low, that is, in a negative direction, along with the high output signal from the threshold circuit 43, enables the triggering of the one-shot 65, see FIG. 3. The DELAY signal of one-shot 65 is applied to one-shot 67 and after 14 microseconds, the astable time of one-shot 65, the DELAY signal will go low and trigger one-shot 67 if, and only if, a NAT BAR pulse has not been received. In the example being described, no NAT BAR pulse can be produced because the waveshape of the symbol "4" as shown in FIG. 6 will not allow the peak detector to be activated. Thus, the output of the inverter 61 in FIG. 3 will be high and enable the triggering of one-shot 67.

One-shot 67 produces the ART BAR signal representing that an artificial bar pulse has been produced. The ART BAR pulse produces a BAR pulse on the output lead 75 of OR-gate 63. This BAR pulse signal triggers one-shot 71 to produce the fifth AT signal and also triggers the one-shot 99 on FIG. 4 to perform the shift in the register. Thus, the shifting one-shots in turn effectively cause the shift of the "1" in R4 to R5; the "0" in R3 to R4; the "0" in R2 to R3; and the "1" in R1 to R2. Since the BAR pulse which resulted from the ART BAR signal describes a narrow space, a '0" is played into flip-flop 81 because the BT signal, applied to the reset input of flip-flop 81, is still high when the one-shot 91 triggers the flip-flop 81.

A complete symbol has been received and now the system awaits the reset of the one-shot 103, see FIG. 5, whose output signal DT describes a certain set time during which a complete symbol must be received or an error will be signified. The DT signal will go to a low level when the one-shot 103 returns to its stable state which is after 235 microseconds have passed. Still referring to FIG. 5, the DT will trigger one-shot 109 when it goes to a low level. One-shot 109 will be triggered since the R5 signal, fed to the enabling input of one-shot 109, is high. The R5 signal is high because five BAR pulses were produced and thus, the "1" originally placed into the R1 flip-flop 81 on the first BAR pulse has been correctly shifted into the R5 flip-flop 89.

One-shot 109 produces a READ signal on its output. This READ signal is applied to the decoding logic circuit 101 of FIG. 4. The READ signal enables internal output gates of the decoding circuit 101 and thus, as according to the table of FIG. 2 which shows the binary signal of the register signals, the symbol read is a "4." The output "4" of the decoding circuit will be high since the binary output of the register flip-flops, R1 through R4, matches that required in the Coding Table of FIG. 2. Thus, as described, R1 is in a "0" state, R2 is in a "1" state, R3 is in a "0" state, and R4 is in a "0" state.

The READ signal is also fed to the one-shot 111, see FIG. 5, in order to produce a CLEAR output which resets or clears all of the registers in the shift register of FIG. 3. As stated before, this prepares the registers for the next symbol.

If five BAR pulses had not been produced or for some reason the R5 signal is not high when one-shot 103 returns to its stable state, see FIG. 5, an ERROR signal is produced and signals that a symbol on the document has not been read correctly by the system. Corrective action must then be taken.

Therefore, what has been described as a system for automatically reading and recognizing each symbol of a font of symbols especially adapted for printing by high-speed printers such as computer output printers, by typewriters, and by other common printing machines. The system herein described as the preferred embodiment uses a five bar symbol in a discontinuous form to give the symbols a humanly recognizable form. It is apparent to one skilled in the art that the use of a humanly recognizable form and a vertical bar symbol is merely choice, and symbols comprising other marks such as circles, wavy bars, horizontally or vertically shaped lines, and the like, could be used. The amount of marks comprising the symbol is also arbitrary and can be increased or decreased without departing from within the scope of this invention.

The basic advantage of this system is that a form of a degraded print is accepted and read correctly by the use of this invention. The system is described herein as tolerating the nonrecognition of a narrow space between the bars of a symbol. It is evident that the system could have been described as accepting the nonrecognition of widely spaced bars. However, it has been found that the majority of the printing errors are the result of the nonrecognition of the space between adjacent narrowly spaced bars. Thus, the embodiment shown and described herein uses the invention to its best known advantage.

While the principles of the invention have been made clear in the illustrative embodiments, there will be obvious to those skilled in the art, many modifications in structure, arrangement, proportions, elements, materials, and components used in the practice of this invention, which were adapted for specific environmental and operational requirements and which may be changed without departing from these principles. The appended claims are, therefore, intended to cover and embrace any such modifications within the limits only of the true spirit and scope of the invention.

What is claimed is:

1. The combination of:

a plurality of individually discernible spaced-apart marks placed on a media and describing a unique combination of narrow and wide spaces between adjacent marks, said unique combination of narrow and wide spaces being representative of a symbol, one or more of said symbols having a degraded form resulting in an extraneous scannable material being between one or more of the adjacent marks of the symbol;

said marks being formed of a scannable material capable of being sensed in relationship with the media itself;

scanning means for scanning said symbol and sensing a scannable material;

first pulse generating means actuated by said scanning means for generating a pulse at its output for each discernible mark of the symbol sensed by the scanning means;

timing means actuated by said first pulse generating means to measure a time after each mark; and second pulse generating means responsive to said scanning means, said first pulse generating means, and said timing means, for generating a pulse at its output when the scanning means is sensing the extraneous scannable material at a time measured by said timing means and no pulse is generated by said first pulse generating means.

2. The combination of claim 1 wherein the marks of the symbol comprise vertical, substantially parallel bars.

3. The combination of claim 1 including detecting means responsive to the pulse output of the first and the second pulse generating means to detect the widely spaced adjacent marks and to detect the narrowly spaced adjacent marks.

4. The combination of claim 3 including decoding means responsive to the detecting means to produce a signal identifying the symbol scanned according to the combination of narrow and wide spaces between the marks forming the symbol.

5. A system for reading symbols arranged on a face of a media, each of the symbols normally being formed by a plurality of individually discernible marks, in a unique combination of narrow and wide spaces between adjacent marks, said marks being formed with a material capable of being scanned and sensed by a scanning means, one or more of said symbols having a degraded form resulting in an extraneous material being between one or more of the adjacent marks of the symbol thereby forming a nondiscernible mark; the system comprising:

first pulse generating means responsive to the scanning means for providing an output pulse representative of each discernible mark of the symbol sensed by the scanning means;

second pulse generating means responsive to said scanning means and said first pulse generating means for generating an output pulse when a nondiscernible mark is sensed by the scanning means and no output pulse issues from said first pulse generating means;

detecting means responsive to the pules output of the first and the second pulse generating means to detect the widely spaced adjacent marks and to detect the narrowly spaced adjacent marks; and decoding means responsive to the detecting means to produce a signal identifying the symbol to the system according to the combination of narrow and wide spaces between the marks forming the symbol.

6. A reading system comprising:

a media having symbols printed thereon, each of said symbols being formed of a plurality of marks, with the marks of each symbol being spaced apart from adjacent marks in a combination of wide and narrow spaces between adjacent marks that are different from the combination of wide and narrow spaces of every other symbol;

means including scanning means to scan the symbol and to produce a time-spaced pulse for each mark sensed from said document;

means for generating a time-spaced pulse in replacement of each time-spaced pulse not produced from the marks sensed by the scanning means when a degraded form of the marks results in the second of two adjacent spaced marks not being sensed by said scanning means;

timing means actuated by each of the time-spaced pulses received from the pulse producing means and the pulse generating means for procuring a timing signal having a period which is greater than the time required to scan between adjacent narrowly spaced marks of a symbol and less than the scanning time between adjacent widely spaced marks;

means jointly responsive to said timing signal and said time-spaced pulses for producing a narrow space indication in response to the concurrent occurrence of the timing signal and the time-spaced pulses and for producing a wide space indication in response to the occurrence of a time-spaced pulse in the absence of said timing signal; and means for decoding the narrow space indications and the wide space indications of each symbol to produce a signal identifying each symbol on the document.

7. A system for reading symbols formed on a face of a media by a material capable of being sensed in relationship to the face of the media, each of the symbols being normally formed of spaced apart marks adjacent ones of said marks being spaced by a predetermined wide and a predetermined narrow space, with an improvement to the reading system to allow the reading of a normal symbol and a degraded symbol, said system comprising:

scanning means for scanning said symbols to sense the material forming the marks in order to produce an output signal which is in a first state while scanning the material and a second state while scanning the media;

means for providing relative motion between the scanning means and the document;

first pulse generating means actuated by the scanning means for generating a pulse output signal representative of the marks of the symbol and indicative of an output change of the scanning means from the first state to the second state;

second pulse generating means actuated by the scanning means and the first pulse generating means for generating a pulse output signal when the scanning means senses the presence of an extraneous material between the adjacent marks of the degraded symbol form;

timing means actuated by said first and second pulse generating means to produce on its output a timing signal which is greater than the scanning time between adjacent narrowly spaced marks and less than the scanning time between adjacent widely spaced marks;

means jointly responsive to said timing means and to the pulses from the first and the second pulse generating means for producing a narrow space indication in response to the concurrent occurrence of the timing signal and the generated pulse from the first and second pulse generating means and for producing a wide space indication in response to the occurrence of the generated pulse in the absence of said timing signal; and means for decoding the narrow space indications and the wide space indications of each symbol to produce a signal identifying that symbol to the system.

8. The system of claim 7 wherein the second pulse generating means comprises:

a first one-shot multivibrator having an input lead and an output signal;

a first AND-gate having its output signal applied to the input lead of said first one-shot multivibrator to actuate the multivibrator from a stable state to an astable state, and having the output signal of the scanning means applied to one input lead and having the output signal of the timing means applied to a second input lead;

a second one-shot multivibrator having an input lead and an output signal;

an inverter having on its input lead the output signal of the first pulse generating means and having an output signal; and a second AND-gate having its output signal applied to the input lead of said second one-shot multivibrator and having the output signal of the inverter applied to one input lead and having the output signal of the first one-shot multivibrator applied to a second input lead.

References Cited

UNITED STATES PATENTS

| | | | |
|---|---|---|---|
| 3,461,427 | 8/1969 | Parker | 340—146.3 |
| 3,286,233 | 11/1966 | Lesver | 340—146.3 |
| 3,309,667 | 3/1967 | Feissel et al. | 340—146.3 |
| 3,354,432 | 11/1967 | Lamb | 340—146.3 |

THOMAS A. ROBINSON, Primary Examiner